United States Patent
Rosen et al.

[11] Patent Number: 6,059,255
[45] Date of Patent: *May 9, 2000

[54] STOWABLE DISPLAY APPARATUS

[75] Inventors: John B. Rosen, Eugene; James C. Dezotell, Creswell, both of Oreg.

[73] Assignee: Rosen Products LLC, Eugene, Oreg.

[ * ] Notice: This patent is subject to a terminal disclaimer.

[21] Appl. No.: 09/046,498

[22] Filed: Mar. 23, 1998

Related U.S. Application Data

[63] Continuation-in-part of application No. 08/884,445, Jun. 21, 1997, Pat. No. 5,946,055, and a continuation-in-part of application No. 29/058,538, Aug. 16, 1996, Pat. No. Des. 399,200.

[51] Int. Cl.$^7$ .................. E05C 1/12; E05C 1/06
[52] U.S. Cl. .......... 248/917; D14/132; 292/170; 292/140
[58] Field of Search ................ 248/285.1, 917, 248/919, 923, 284.1, 286.1, 291.1, 222.11, 221.11, 292.13; 292/174, 165, 169, 140; 348/825, 827, 837, 836, 838; D14/132–134, 113

[56] References Cited

U.S. PATENT DOCUMENTS

| | | | |
|---|---|---|---|
| D. 390,143 | 2/1998 | Rosen | D10/104 |
| D. 390,219 | 2/1998 | Rosen | D14/132 |
| D. 394,432 | 5/1998 | Rosen | D14/132 |
| D. 398,921 | 9/1998 | Rosen | D14/132 |
| D. 399,200 | 10/1998 | Rosen | D14/132 |
| 893,072 | 7/1908 | Hayes | 292/174 |
| 1,257,998 | 3/1918 | Gruber | 292/170 |
| 1,872,440 | 8/1932 | Frost et al. | 292/170 |
| 1,907,625 | 5/1933 | Vogt | 70/100 |
| 2,153,819 | 4/1939 | Voorhees | 292/170 |
| 2,247,937 | 7/1941 | Bittorf et al. | 292/170 |
| 2,718,421 | 9/1955 | Slopa et al. | 292/165 |
| 3,055,204 | 9/1962 | Pelcin | 70/153 |
| 3,077,359 | 2/1963 | Ettore et al. | 292/170 |
| 3,156,493 | 11/1964 | Griffiths | 292/170 |
| 3,737,184 | 6/1973 | Swartz | 292/170 |
| 5,145,128 | 9/1992 | Umeda | 248/918 |
| 5,583,735 | 12/1996 | Pease et al. | 361/170 |

*Primary Examiner*—Anita M. King
*Assistant Examiner*—Michael Nornberg
*Attorney, Agent, or Firm*—Kolisch, Hartwell, Dickinson, McCormack & Heuser

[57] ABSTRACT

A stowable display apparatus is disclosed that includes a base adapted to be mounted on the ceiling of a vehicle, such as an automobile, and a display unit that is mounted on the base. The display unit is pivotal with respect to the base in a range of positions between a stowed position, in which the unit is retained proximate the base and generally parallel to the ceiling of the vehicle, and a deployed position, in which the unit is pivoted away from the base into the passenger compartment of the vehicle. The display unit further includes a push-button mechanism that selectively engages the display unit to retain the unit in the stowed position. The mechanism includes a push-button actuator that is moveable between a rest position, in which the mechanism is positioned to engage the display unit, and a depressed position, in which the actuator is moved toward the base and the mechanism freed from engagement with the display unit, thereby enabling the display unit to pivot away from the stowed position.

34 Claims, 4 Drawing Sheets

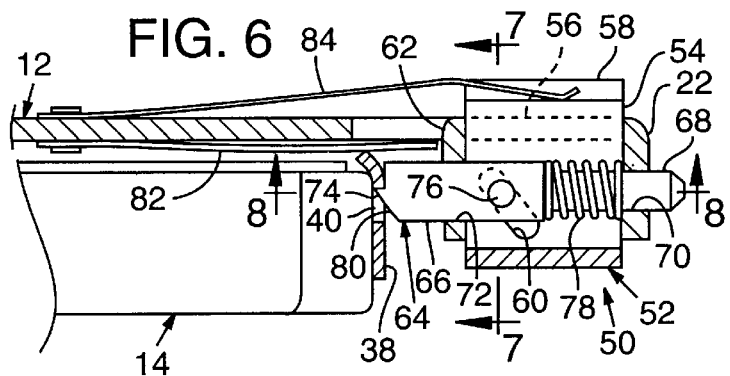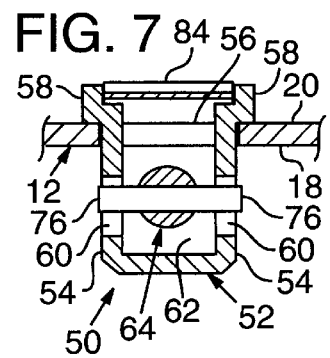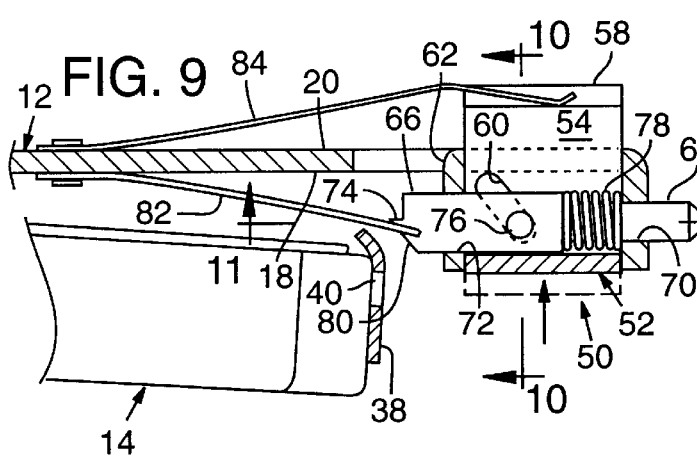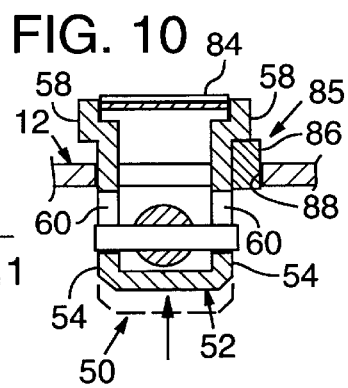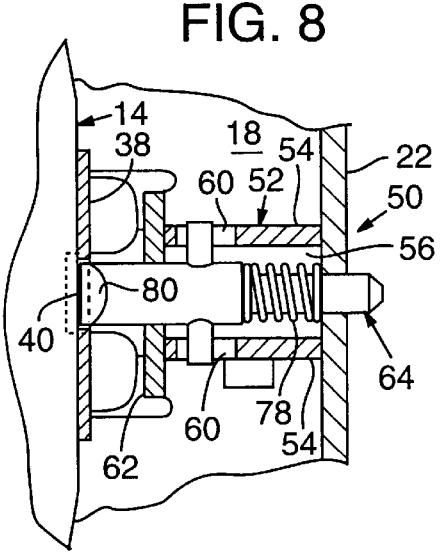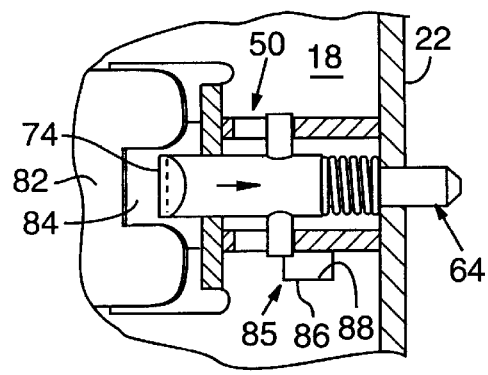

STOWABLE DISPLAY APPARATUS

CROSS-REFERENCE TO RELATED APPLICATIONS

This application is a continuation-in-part of U.S. Ser. No. 08/884,445, filed Jun. 21, 1997, now U.S. Pat. No. 5,946,055, of John B. Rosen which issued Aug. 31, 1999 for a DISPLAY UNIT and a continuation-in-part of U.S. Ser. No. 58,538, filed Aug. 16, 1996, now U.S. Pat. No. Des. 399,200 of John B. Rosen which issued Oct. 6, 1998 for a CEILING-MOUNTED MONITOR SYSTEM.

FIELD OF THE INVENTION

The present invention relates generally to display units and support structures therefor. More particularly, the invention concerns an apparatus that includes a stowable display unit and supporting structure therefor, which are adapted to present a viewing surface to occupants of a vehicle.

BACKGROUND AND SUMMARY OF THE INVENTION

Automotive manufacturers have long sought to make passengers as comfortable as possible during travel, focusing both on physical comfort and on the passenger's entertainment. For example, vehicle sound systems have become standard accessories in most cars and trucks. In recent years, efforts have involved attempts to bring video technology into the passenger compartment, either in the form of a television, a computer, a video game display or other devices for displaying visual or audio-visual information to a passenger.

Unfortunately, display units have heretofore been impractical as automotive accessories due to problems in mounting conventional display units within a vehicle. One problem relates to the size of most display units, because space is at a premium in most vehicles. Therefore it is difficult to find sufficient space for a standard-sized display unit.

Another problem arises from difficulties placing the display unit in a position where it may be viewed by a passenger but will not obstruct the driver's view of the road. Besides not obstructing the driver, the display unit needs to be positioned so that the driver will not be distracted by the images displayed on the unit, even if the driver's view is not obstructed.

Still another problem involves the stowability of the display unit, and its corresponding effect on passenger safety. Because of its close proximity to the vehicle's seating area, the display unit must be stowable during ingress and egress so it does not interfere with passenger movement. Moreover, after a passenger is seated, the apparatus should be accessible in an ergonomically advantageous way. The user also should be able to position selectively the display unit for comfortable viewing angles. Similarly, the controls or other adjustment mechanisms of the apparatus should be positioned so they may be reached easily by passengers. In situations where the apparatus is meant to be viewed by multiple passengers, the controls should be positioned and designed so they are comfortably accessible by any of these passengers.

Because travelers, and seating areas therefor, may differ dramatically in size and shape, the support apparatus should be adjustable to present the display unit at a user-selected viewing angle, regardless of the size or shape of the particular seat or user. Furthermore, even similarly sized individuals may have different preferred viewing angles. Therefore a stowable support apparatus not only should adjust between a stowed and a display, or user-viewable, position, but also should enable a user to adjust the viewing orientation of the display unit to suit that user's particular needs or preferences.

Safety is also of utmost importance when such an apparatus is used by a passenger, or passengers, while a vehicle is in transit. Sudden stops, starts, or changes in direction could cause the display unit to fly out of control and damage the unit or injure the intended viewer or nearby passengers. Therefore, there is a need for a stowable support apparatus which is constrained from freely moving or otherwise adjusting when the vehicle or passenger undergoes sudden stops or movements. A competing, and equally important concern, however, is that the apparatus must collapse or yield if impacted by the user, such as during a collision or rapid change in direction or speed. If the display unit remains rigidly positioned when impacted, the user is prone to severe injury when he or she impacts this non-yielding structure. To satisfy both concerns, the display unit should retract or otherwise pivot to a safe position when struck by a user or other object, yet resist changes in position solely on account of changes in the vehicle's speed or direction.

Known display units also have been unable to meet consumer expectations due to difficulties in providing acceptable picture quality in a package of suitable size. However, with advancements in flat-panel display technology, picture quality of smaller display units has improved dramatically. The present invention takes advantage of these improvements and overcomes the above and other disadvantages of other display units by providing a stowable display apparatus which is well-suited for mounting in the passenger compartment of a vehicle.

In brief summary, the apparatus includes a base adapted to be mounted on the ceiling of a vehicle, such as an automobile, and a display unit that is mounted on the base. The display unit is pivotal with respect to the base in a range of positions between a stowed position, in which the unit is retained proximate the base and generally parallel to the ceiling of the vehicle, and a deployed position, in which the unit is pivoted away from the base into the passenger compartment of the vehicle. The display unit further includes a push-button mechanism with a push-button actuator that selectively engages the display unit to retain the unit in the stowed position. The mechanism is moveable between a rest position, in which it is positioned to engage the display unit, and a depressed position, in which the mechanism is freed from engagement with the display unit as the push-button actuator is moved toward the base, thereby enabling the display unit to pivot away from the stowed position.

These and other advantages and features of the invention will become more fully apparent as the detailed description below is read with reference to the accompanying drawings.

BRIEF DESCRIPTION OF THE DRAWINGS

FIG. 6 is an enlarged detail taken along line 6—6 in FIG. 4, showing a push-button mechanism retaining the display unit in the stowed position.

FIG. 7 is a cross-sectional view taken along line 7—7 in FIG. 6 and showing the internal construction of the push-button mechanism.

FIG. 8 is a sectional plan view taken along line 8—8 in FIG. 6.

FIG. 9 is a cross-sectional view similar to that of FIG. 6, but with the push-button mechanism in a depressed position and the display unit pivoted away from the stowed position.

FIG. 10 is a cross-sectional view taken along line 10—10 in FIG. 9 and showing the internal construction of the push-button mechanism when the push-button mechanism is in the depressed position.

FIG. 11 is a sectional plan view taken along line 11—11 in FIG. 9.

FIG. 11 is a cross-sectional view taken along line 13—13 in FIG. 12.

DETAILED DESCRIPTION OF THE PREFERRED EMBODIMENTS AND METHOD OF USING THE SAME

Figure 1:
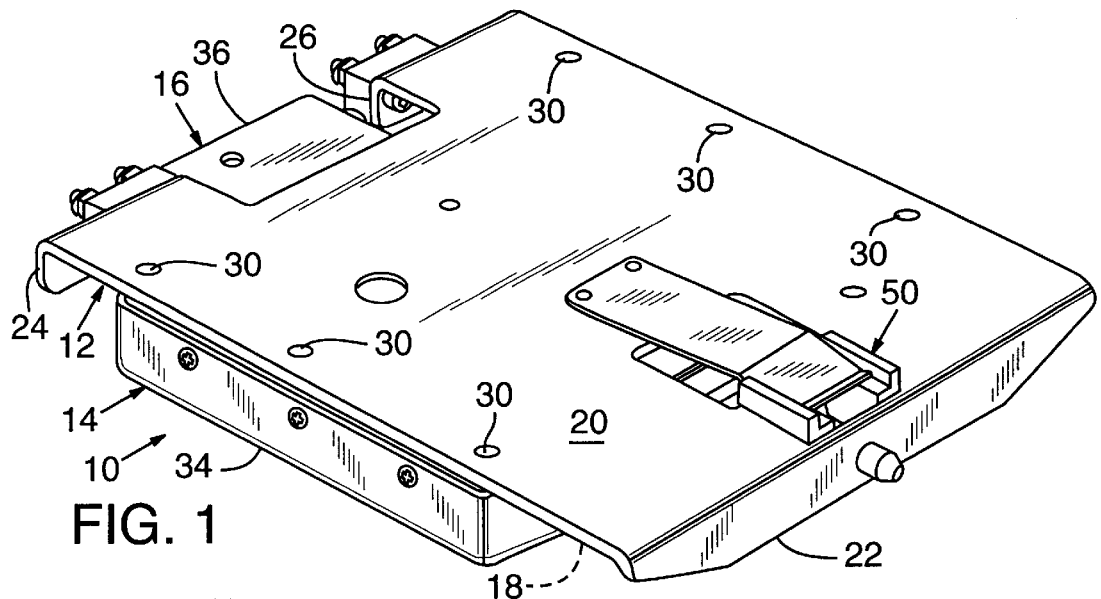
FIG. 1 is an isometric view showing a stowable display apparatus constructed in accordance with the present invention, the view being taken from above.
Figure 2:
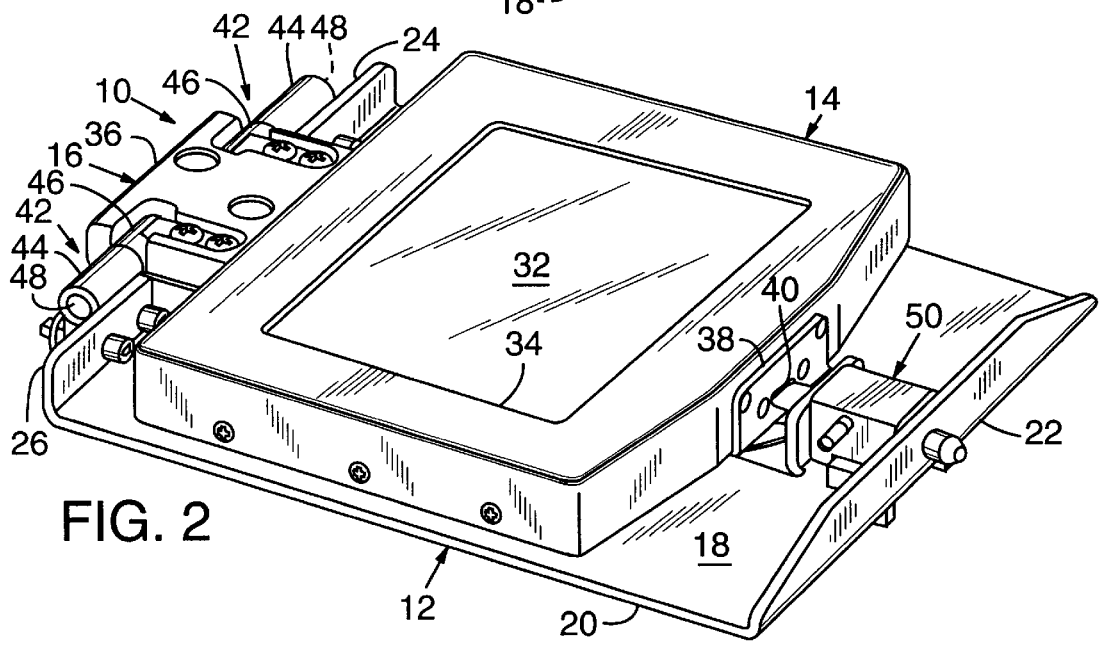
FIG. 2 is an isometric view showing the apparatus of FIG. 1 from below, the display unit being shown in a stowed position.
Figure 3:
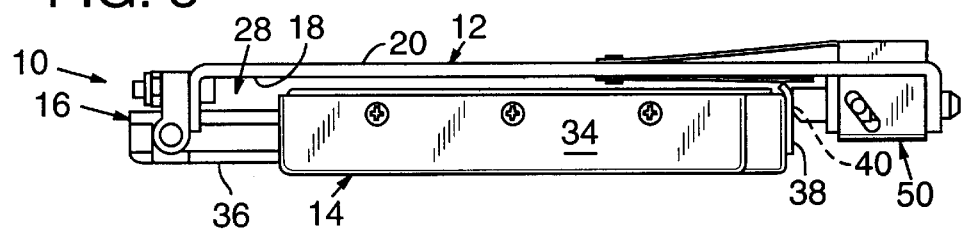
FIG. 3 is a side elevation view of the apparatus of FIGS. 1 and 2.
Figure 4:
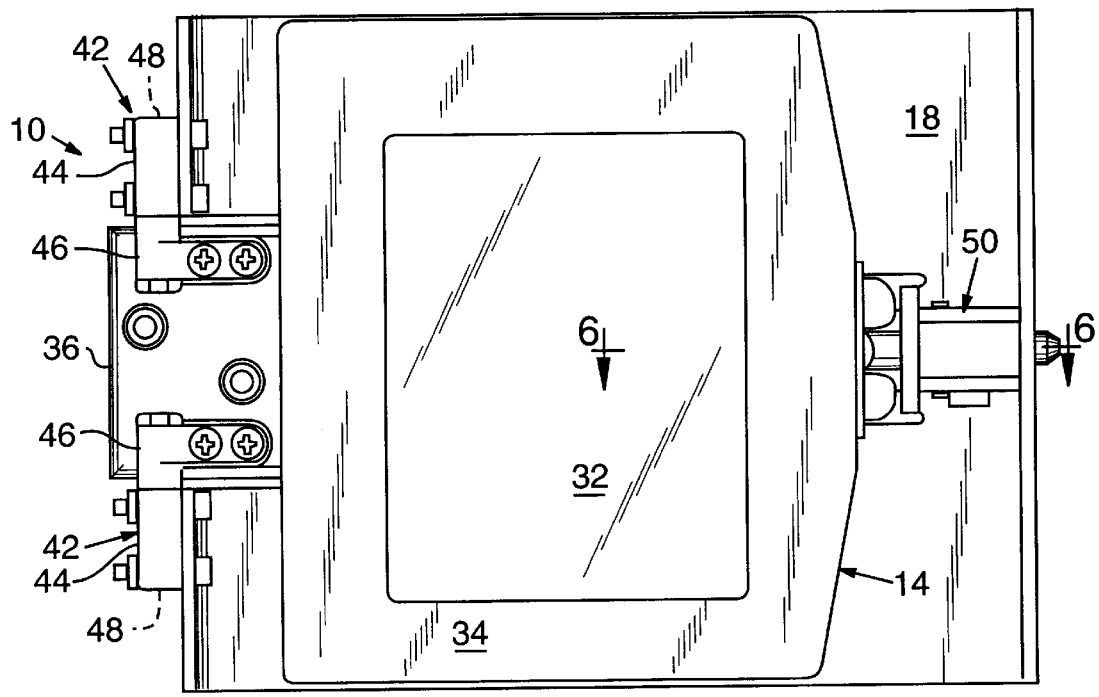
FIG. 4 is a bottom plan view of the apparatus of FIGS. 1 and 2.

A stowable support apparatus constructed according to the present invention is shown in FIGS. 1–4 and indicated generally at 10. Apparatus 10 is intended for use on a vehicle, and more particularly, intended to be mounted on the ceiling of an automobile for viewing by passengers in the passenger compartment of the vehicle.

As indicated, apparatus 10 includes a base 12, and a display unit 14 which is pivotally mounted on base 12 by hinge structure 16. The depicted apparatus typically is mounted on the ceiling of the vehicle generally forward of the passenger seating area to accommodate pivotal deployment for viewing by one or more rear-seat passengers without distracting or obstructing the view of the driver of the vehicle. It should be understood, however, that apparatus 10 also may be adapted for use in other vehicles or settings where it is desirable to have a stowable display apparatus in which the display unit is selectively pivotal between a stowed, out-of-the-way position and a deployed, user-viewable position.

Base 12 has a generally planar configuration and includes a lower surface 18, an upper surface 20, a forward edge portion 22 and a pair of spaced-apart rearward edge portions 24 and 26. Edge portions 22–26 extend away from lower surface 20 to generally define a cavity 28 into which display unit 14 is secured in its stowed position, as shown in FIGS. 1–4. As discussed, base 12 is configured to be mounted on an overhead, generally planar surface, such as the ceiling of the passenger compartment of a vehicle. Base 12 includes a plurality of spaced-apart mounting holes 30 through which conventional fasteners, such as screws, may be passed to secure apparatus 10 to a selected mounting surface. In some applications, it may be desirable to provide a housing or shell that is mounted on the ceiling of the vehicle and into which apparatus 10 is at least partially inserted to protect apparatus 10 and/or conform the apparatus to the contours of the ceiling of the vehicle.

Display unit 14 includes a screen portion 32 through which images and other information is conveyed to a viewer. As discussed, display unit 14 may serve as a television screen, a computer screen, a video game display, or virtually any other device for displaying visual or audio-visual information to a viewer. Screen portion 32 is protected by a housing 34, which is sized to receive and generally conform to the size and shape of the screen portion. Unit 14 further includes a neck portion 36 that extends away from housing 34 toward rearward edge portions 24 and 26 on one side of the housing. The display unit also includes a strike plate 38, which defines a receiver 40. Receiver 40 is adapted for engagement by a push-button mechanism 50 to retain display unit 14 in its stowed position.

It should be understood that it is within the scope of the present invention that display unit 14 may be formed without strike plate 38, and may instead simply include a receiver 40 either in the position shown in the Figures, or elsewhere, as long as the subsequently described lock mechanism is operatively positioned on or adjacent base 12 to selectively engage the receiver. Furthermore, while receiver 40 is shown as a recess in display unit 14, it may vary in size and configuration so long as it is adapted to be selectively engaged by the lock mechanism to retain the display unit in its stowed position. For example, receiver 40 may include a clasp, detent or other suitable structure extending into or from display unit 14 and adapted to be selectively engaged to retain the display unit in its stowed position.

Display unit 14 may be a self-contained unit, although in many applications may be connected to a supply (not shown) from which it receives power. The display unit also may be connected to a signal source (not shown) which provides control signals, data streams, etc. For example, display unit 14 may be connected by suitable wiring to a video control module that directs operation of the screen. When display unit 14 is not a self-contained unit, wiring, such as a power and/or data cord, needs to be connected to the unit. For example, the wiring may extend through neck portion 36 so as not to hinder the pivotal movement of the display unit between its stowed and deployed positions.

Figure 5:
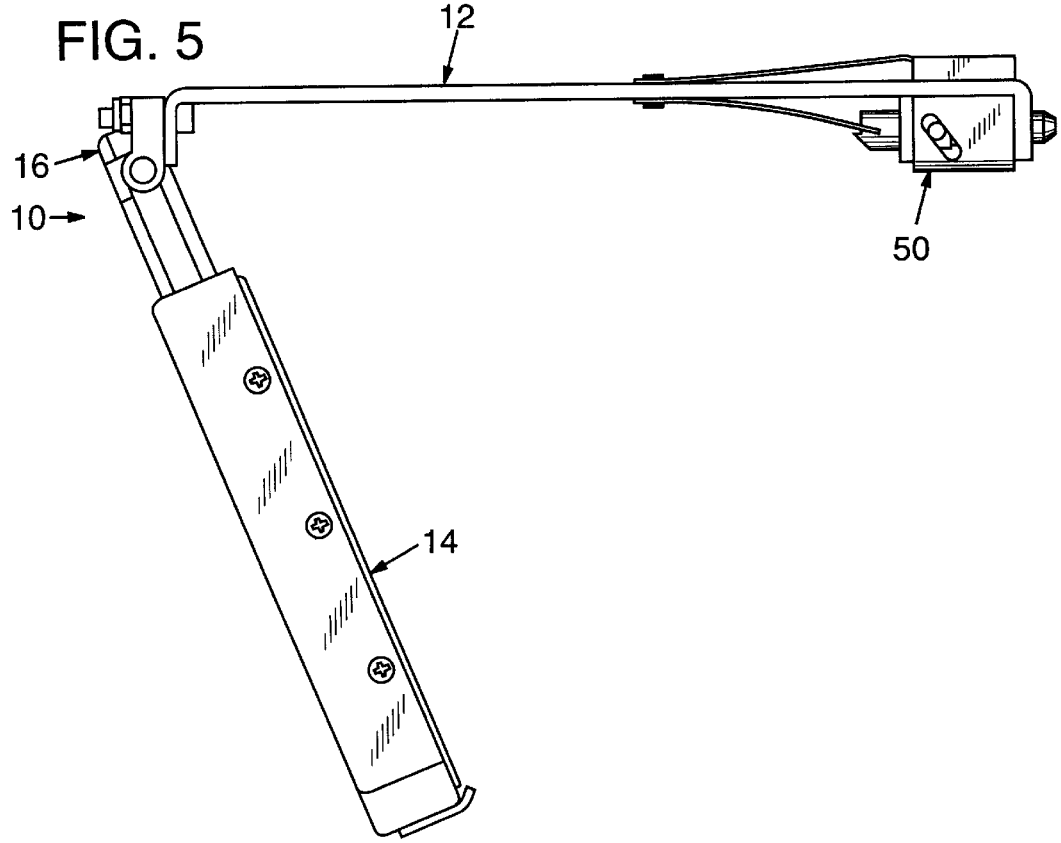
FIG. 5 is a side elevation view similar to that of FIG. 3, but with the display unit in a deployed position.

Hinge structure 16 pivotally connects display unit 14 and base 12 and enables display unit 14 to pivot within a range of positions from a stowed position, in which it is retained proximate base 12, and a deployed position, in which it is pivoted away from the stowed position, such as to a user-viewable orientation shown in FIG. 5. As shown in FIGS. 1–4, in its stowed position, display unit 14 extends generally parallel to the plane of base 12. In a typical mounting position on the ceiling of a vehicle, this would be a generally horizontal orientation. Hinge structure 16 may include any conventional structure for joining and enabling pivotal movement of a pair of members, such as base 12 and display unit 14.

Because apparatus 10 will be subjected to a variety of forces and vibrations when installed in a vehicle, hinge structure 16 should have sufficient resistance or frictional force to prevent display unit 14 from moving from a user-selected viewing position during normal operation of the vehicle, however, it should yield or retract if impacted by a passenger or other object such as in an emergency situation. Furthermore, because the display unit pivots from a horizontal position into the passenger area and toward a viewer, if the viewer is suddenly thrown forward or otherwise impacts display unit 14, it will pivot under the force of contact toward its stowed position, thereby preventing injury to the viewer which would otherwise be caused if the unit was fixed in its viewing position.

An illustrative, but not limiting, example of a suitable hinge structure is shown in FIGS. 1–5. As perhaps best seen in FIGS. 2 and 4, structure 16 includes a pair of hinges 42, each having a pair of hinge elements 44 and 46, one secured to one of rearward flange-like members 24 and 26, and the other secured to neck 36 of display unit 14. The hinge elements are pivotally joined by pins 48, about which the legs rotate to enable the pivotal adjustment of display unit 14 with respect to base 12.

Display apparatus 10 further includes a push-button mechanism 50 that selectively engages display unit 14 to retain the display unit proximate the base, in its stowed position. Mechanism 50 may also be referred to as a lock mechanism. Mechanism 50 is positioned to selectively engage display unit 14 to retain the unit in its stowed position. From a rest position (shown in FIGS. 1–5), the push-button actuator 52 of mechanism 50 is moved toward base 12, in a direction generally transverse to the plane of base 12, to a depressed position. In the depressed position, the mechanism is freed from engagement with display unit 14, thereby freeing unit 14 to pivot away from its stowed position to the user-viewable position.

It should be understood that the specific user-viewable orientation to which the unit is pivoted, or deployed, will vary depending upon the viewing preferences of the user or users, as well as the specific shape and position of the surface or vehicle on which apparatus 10 is mounted. For example, the height of the ceiling in a minivan above its seats will generally be greater than in a compact automobile. Similarly, since passengers will vary in height, they will tend to prefer to have the display unit oriented at different angles with respect to base 12. Typically, the preferred viewing angle with respect to the plane of the base or ceiling of the vehicle will be between approximately 45° and approximately 90°, although angles greater or less than this range are also within the scope of the invention because the shape and size of the passenger compartments and the number of viewing passengers will vary depending upon the specific application of the apparatus.

In FIGS. 6–11, the internal construction and interaction of push-button mechanism 50 and the adjacent components of apparatus 10 are shown in more detail. More specifically, in FIGS. 6–8, display unit 14 is in its stowed position, and push-button mechanism 50 is in its rest position. In FIGS. 9–11, the display unit is in a deployed position, and push-button mechanism 50 is in its depressed position.

Mechanism 50 includes a push-button actuator 52 with a pair of side walls 54 that extend toward base 12, generally transverse to the plane of the base. As shown in FIGS. 6 and 7, side walls 54 further extend through an aperture 56 in base 12 and terminate in a pair of flange-like members 58. Members 58 are sized so that they cannot pass through aperture 56 and thus prevent actuator 52 from passing completely through the aperture from the upper surface of base 12. As shown, each side wall 54 further includes a track, such as slot 60, that extends at an angle away from base 12 to guide the movement of the subsequently described catch or lock pin.

Actuator 50 is supported by a support structure as it is moved between its rest and depressed positions. The support structure is shown in FIG. 6 and includes forward end portion 22 and a wall 62 that extends from base 12 in a spaced-apart, generally parallel relationship to end portion 22. As shown, wall 62 is formed from a cut-out, downwardly bent portion of base 12. Portion 22 and wall 62 support opposing ends of actuator 52 and guide the path of the actuator as it travels between the rest and depressed positions.

Mechanism 50 further includes a catch, such as lock pin 64, that is drawn into and out of engagement with display unit 14 as mechanism 50 is moved between its rest and depressed positions. Lock pin 64 has a generally cylindrical cross-sectional configuration with a first portion 66 oriented toward display unit 14 and a second portion 68 of smaller diameter than first portion 66 extending generally away from display unit 14. It should be understood that other cross-sectional configurations may be used as well so long as the lock pin can slide into and out of engagement with display unit 14, as described herein. Lock pin 64 is supported in its operative positions by a pair of apertures 70 and 72. Aperture 70 is formed in forward end portion 22. Aperture 72 is formed in wall structure 62. Lock pin 64 includes a tip 74 that is shaped to engage receiver 38 on display unit 14 and prevent the display unit from pivoting away from its stowed position until the receiver is freed from engagement with tip 74.

Lock pin 64 further includes a pair of opposed tabs 76 that extend generally transverse to the long axis of the lock pin 64. Tabs 76 may be integrally formed with the rest of lock pin 64, or alternatively may be mounted on the preformed pin, such as by inserting a dowel pin through a bore extending transverse to the long axis of the lock pin, as shown in FIG. 7. Tabs 76 are each at least partially received by a respective one of tracks 60 in the walls of actuator 52, as shown in FIGS. 6–7. When a passenger actuates mechanism 50 by pressing on actuator 52, the actuator moves from its rest position toward base 12 to its depressed position. This movement of actuator 52 transverse to the plane of base 12 causes lock pin 64 to be drawn away from display unit 14 as its tabs 76 are guided along inclined tracks 60. This movement of tabs 76 along tracks 60 can be seen by comparing FIGS. 6–8 (rest position) to FIGS. 9–11 (depressed position).

Also shown in the FIGS. 6 and 8–9 is a spring 78 that extends between first portion 66 of lock pin 64 and end portion 22 of base 12 to bias the lock pin toward display unit 14. Spring 78 also enables display unit 14 to snap into its stowed position when pivoted thereto by a passenger without requiring the passenger to manipulate or adjust push-button mechanism 50. Instead, the passenger merely pivots display unit 14 toward its stowed position. As unit 14 nears its stowed position, display unit 14 engages an inclined lower surface 80 on tip 74 and causes lock pin 64 to move away from its rest position to enable display unit 14 to be fully returned to its stowed position. Once therein, spring 78 returns lock pin 64 to its rest position, where its tip 74 engages receiver 40 and retains display unit 14 in its stowed position.

As shown for example in FIGS. 1 and 6, it can be seen that apparatus 10 includes a leaf spring or other suitable bias mechanism 82, which is adapted to urge display unit 14 away from its stowed position and which pivots the display unit away from its stowed position when the display unit is freed from engagement with push-button mechanism 50. As shown, leaf spring 82 is secured to lower surface 18 of base 12 and extends into cavity 28 to engage display unit 14 and urge it away from base 12. When display unit 14 is in its stowed position, such as shown in FIG. 6, it compresses or deforms leaf spring 82 toward base 12. When unit 14 is freed from engagement with mechanism 50, the force of leaf spring 82 against display unit 14 causes the unit to pivot away from base 12, such as to the position shown in FIG. 9 or beyond, where it can more easily be reached by a passenger and adjusted to a selected viewing position.

Apparatus 10 further includes a second leaf spring or other suitable bias mechanism 84 (shown in FIGS. 5–7) that is adapted to urge push-button mechanism 50 toward its rest position. As shown, second leaf spring 84 is mounted on upper surface 20 of base 12 and engages flange-like members 58 of actuator 52 to urge the members toward base 12. When push-button mechanism 50 is released from its depressed position (shown in FIGS. 9 and 10), spring 84 acts upon members 58 and moves the actuator back through aperture 56 to return mechanism 50 its rest position (shown previously in FIGS. 6 and 7).

When apparatus 10 is manufactured, it is helpful for the apparatus to include key structure 85 that prevents push-button mechanism 50 from being installed with its tracks 60 oriented in the wrong direction. This key structure, commonly referred to as a "poke yoke" in the industry may include, for example, a projection or other lack of symmetry in the portions of actuator 52 that extend through base 12. Accordingly, push-button mechanism 50 can only be installed in the desired direction. An example of this key structure is shown in FIG. 10, where it includes a projection 86 extending from one side wall 54 of actuator 52 and a corresponding removed region 88 in base 12 through which projection 86 may pass when push-button mechanism is moved between its rest and depressed positions.

Figure 12:
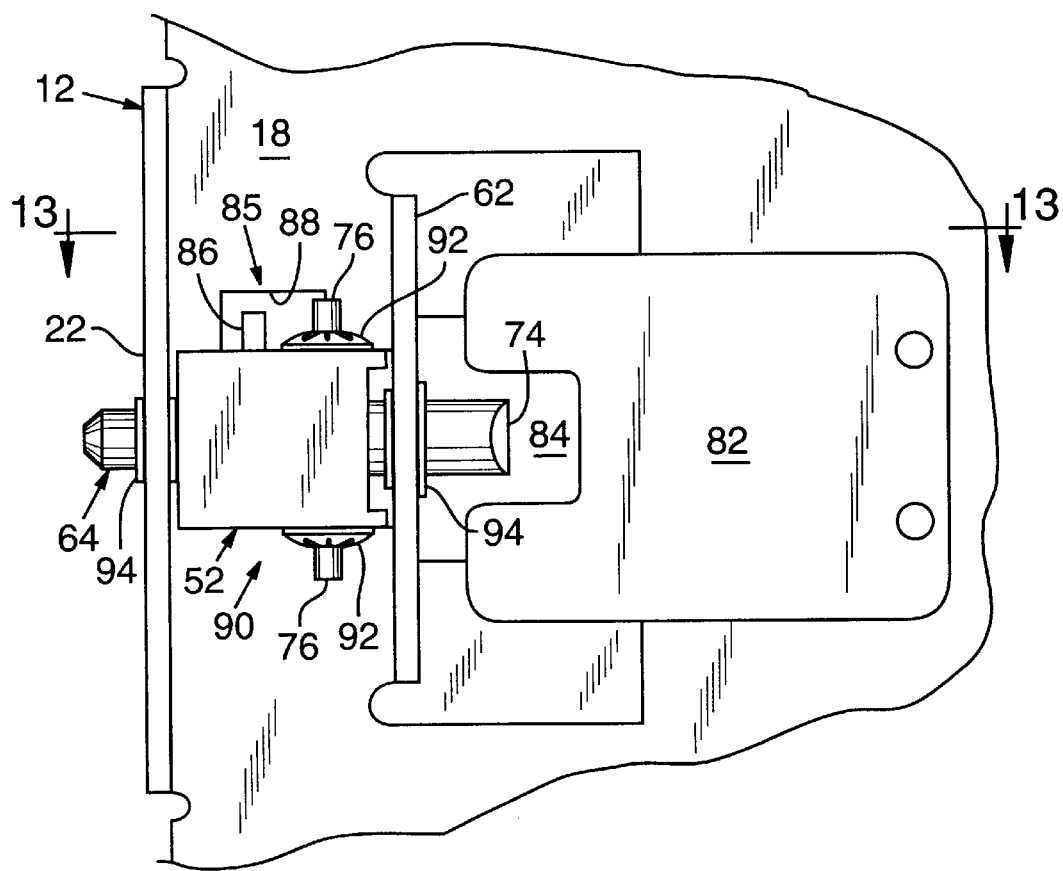
FIG. 12 is a bottom plan view showing an alternative push-button mechanism.
Figure 13:
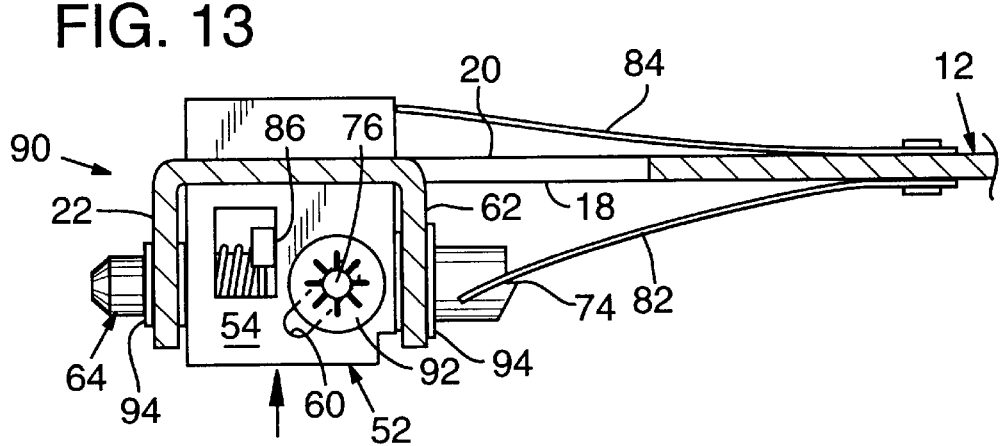

Another embodiment of push-button mechanism 50 is shown in FIGS. 12 and 13 and generally indicated at 90. Unless otherwise indicated, it should be understood that this embodiment includes the same components and subcomponents as the previously described embodiments. As shown, mechanism 90 includes an actuator 52 with walls 54, as well as lock pin 64 with tip 74 and tabs 76. In this embodiment, however, tabs 76 extend outwardly through tracks or slots 60 in walls 54, where they each receive a retainer 92, such as a lock washer, bolt or other suitable fastener that prevents the dowel pin from shifting within lock pin 64. Also, apertures 70 and 72 through end portion 22 and wall structure 62 each include a bushing 94 that eases the movement of lock pin 64 along its path. Bushings 94 may be greased or otherwise lubricated. Similar bushings or lubricants may be used with the previously described embodiment as well. Also shown in FIGS. 12 and 13 is another embodiment of key structure 85.

While the invention has been disclosed in its preferred form, it is to be understood that the specific embodiment thereof as disclosed and illustrated herein is not to be considered in a limiting sense as numerous variations are possible and that no single feature, function or property of the preferred embodiment is essential. The invention is to be defined only by the scope of the issued claims.

I claim:

1. A stowable display apparatus, comprising:
   a base;
   a display unit mounted on the base and pivotal in a range of positions with respect to the base between a stowed position in which the display unit is retained proximate the base, and a deployed position in which the display unit is pivoted away from the stowed position; and
   a push-button mechanism coupled to the base and including a push-button actuator and a catch adapted to engage the display unit to retain the display unit in the stowed position, wherein the actuator is slidable from a rest position in which the catch engages the display unit and retains the display unit in the stowed position, and a depressed position in which the actuator is moved toward the base and the catch is drawn out of engagement with the display unit, thereby enabling the display unit to pivot away from the stowed position.

2. The apparatus of claim 1, wherein the push-button mechanism includes a track in communication with the catch, and wherein at least a portion of the catch is moved along the track and drawn into and out of engagement with the display unit as the push-button actuator is moved between the rest and the depressed positions.

3. The apparatus of claim 2, wherein the catch includes at least one tab extending therefrom to engage and travel along the track as the push-button actuator is moved between the rest and the depressed positions.

4. The apparatus of claim 3, wherein the catch includes a lock pin having a long axis and the tab extends generally transverse to the axis, wherein moving the push-button actuator between the rest position and the depressed position moves the tab along the track to draw the lock pin into and out of engagement with the display unit.

5. The apparatus of claim 1, wherein the actuator includes a pair of spaced-apart walls extending generally transverse to the base, and wherein the catch is substantially housed between the walls.

6. The apparatus of claim 5, wherein the catch includes a lock pin with a long axis and a pair of tabs extending from the long axis, and further wherein each wall includes a track into which a corresponding one of the tabs is received and along which the tab is guided to draw the pin toward or away from the display unit as the button-actuator is moved between the rest and the stowed positions.

7. The apparatus of claim 1, wherein the apparatus further includes a support structure extending from the base to stabilize the push-button actuator as it moves between the rest and depressed positions.

8. The apparatus of claim 1, wherein the apparatus further includes a first bias mechanism adapted to urge the display unit away from the stowed position, and further wherein the first bias mechanism pivots the display unit away from the stowed position when the display unit is free from engagement with the catch.

9. The apparatus of claim 8, wherein the apparatus further includes a second bias mechanism adapted to urge the push-button actuator away from the base, and wherein the second bias mechanism returns the push-button actuator to the rest position when released from the depressed position.

10. The apparatus of claim 1, wherein the base includes an aperture through which the push-button actuator at least partially extends.

11. The apparatus of claim 10, wherein the push-button actuator includes key structure that defines the orientation of the push-button actuator with respect to the base as it extends at least partially through the aperture.

12. An overhead display apparatus for use in a vehicle having a ceiling, the apparatus comprising:
   a base adapted to be mounted on a ceiling of a vehicle;
   a display unit mounted on the base and pivotal with respect to the base in a range of positions between a stowed position and a deployed position, in which the display unit is pivoted away from the stowed position; and
   a push-button mechanism coupled to the base and including a push-button actuator and a lock pin with a tip adapted to engage the display unit and retain the display unit in the stowed position, wherein the actuator is movable between a rest position in which the lock pin positioned to engage the display unit and retain the display unit in the stowed position, and a depressed position in which the actuator is moved toward the base and the lock pin is drawn out of position for engaging the display unit.

13. The apparatus of claim 12, wherein the lock pin further includes a long axis and a tab extending generally transverse to the long axis, and further wherein the push-button mechanism includes a track into which the tab is at least partially received and along which the tab is guided to draw the pin toward or away from the display unit as the actuator is moved between the rest and stowed positions.

14. The apparatus of claim 12, wherein the apparatus further includes a first bias mechanism adapted to urge the display unit away from the stowed position, and further wherein the first bias mechanism pivots the display unit away from the stowed position when the receiver is free from engagement with the tip.

15. The apparatus of claim 14, wherein the apparatus further includes a second bias mechanism adapted to urge the push-button mechanism away from the base, and wherein the second bias mechanism returns the push-button mechanism to the rest position when released from the depressed position.

16. A stowable display apparatus, comprising:

a base defining a plane;

a display unit pivotally mounted on the base and pivotal in a range of positions with respect to the plane of the base between a stowed position in which the display unit is retained generally parallel to the plane, and a deployed position in which the display unit is pivoted away from the stowed position; and a lock mechanism positioned on the base to selectively engage the display unit and retain the unit in its stowed position, wherein the mechanism includes a push-button actuator that is movable from a rest position in which the mechanism is positioned to engage the display unit in its stowed position, to a depressed position in which the actuator is moved transverse to the plane of the base and draws the mechanism out of engagement with the display unit, thereby freeing the display unit to pivot away from the stowed position.

17. The apparatus of claim 16, wherein the lock mechanism includes a catch that selectively engages and disengages the display unit as the actuator is moved between the rest and depressed positions.

18. The apparatus of claim 17, wherein the lock mechanism includes a track that guides the movement of the catch, and wherein at least a portion of the catch is moved along the track as the actuator is moved between the rest and depressed positions.

19. The apparatus of claim 18, wherein the catch is drawn out of a position for engaging the display unit when the actuator is moved from the rest position to the depressed position, and the catch is returned to a position for engaging the display unit when the actuator is moved from the depressed position to the depressed position.

20. The apparatus of claim 18, wherein the catch includes at least one tab extending therefrom to engage and travel along the track as the push-button mechanism is moved between the rest and the depressed positions.

21. The apparatus of claim 20, wherein the catch includes a lock pin having a long axis and a tab which extends generally transverse to the axis, wherein moving the actuator between the rest position and the depressed position moves the tab along the track to draw the lock pin into and out of engagement with the display unit.

22. The apparatus of claim 17, wherein the actuator includes a pair of spaced-apart walls extending generally transverse to the base, and wherein the catch is substantially housed between the walls.

23. The apparatus of claim 22, wherein the catch includes a lock pin with a long axis and a tab extending from the long axis, and further wherein at least one of the walls includes a track into which the tab is received and along which the tab is guided to draw the pin toward or away from the display unit as the button-actuator is moved between the rest and the stowed positions.

24. The apparatus of claim 16, wherein the apparatus further includes a first bias mechanism adapted to urge the display unit away from the stowed position, and further wherein the first bias mechanism pivots the display unit away from the stowed position when the display unit is free from engagement with the lock mechanism.

25. The apparatus of claim 24, wherein the apparatus further includes a second bias mechanism adapted to urge the push-button actuator away from the base, and wherein the second bias mechanism returns the push-button actuator to the rest position when released from the depressed position.

26. The apparatus of claim 16 wherein the base includes an aperture through which the actuator at least partially extends.

27. The apparatus of claim 26, wherein the push-button mechanism includes key structure that defines the orientation of the actuator with respect to the base as it extends at least partially through the aperture.

28. The apparatus of claim 16, wherein the apparatus further includes a support structure extending from the base to stabilize the actuator as it moves between the rest and depressed positions.

29. The apparatus of claim 2, wherein the track is inclined relative to the base.

30. The apparatus of claim 2, wherein the track extends at an angle away from the base as the track extends away from the display unit.

31. The apparatus of claim 13, wherein the track is inclined relative to the base.

32. The apparatus of claim 13, wherein the track extends at an angle away from the base as the track extends away from the display unit.

33. The apparatus of claim 18, wherein the track is inclined relative to the plane of the base.

34. The apparatus of claim 18, wherein the track extends at an angle away from the base as the track extends away from the display unit.

* * * * *